(12) United States Patent
Wang

(10) Patent No.: US 12,466,621 B2
(45) Date of Patent: Nov. 11, 2025

(54) MULTI-PUSH BUTTON FOR VACUUM FOOD STORAGE CONTAINER HAVING VACUUM VALVE

(71) Applicants: Soo Jung Wang, Gyeonggi-do (KR); Young Bin Wang, Gyeonggi-do (KR); Bang Hyang Song, Seoul (KR)

(72) Inventor: Soo Chang Wang, Seoul (KR)

(73) Assignees: Soo Jung Wang, Gyeonggi-do (KR); Young Bin Wang, Gyeonggi-do (KR); Bang Hyang Song, Seoul (KR)

( * ) Notice: Subject to any disclaimer, the term of this patent is extended or adjusted under 35 U.S.C. 154(b) by 745 days.

(21) Appl. No.: 17/625,035

(22) PCT Filed: Jun. 25, 2020

(86) PCT No.: PCT/KR2020/008302
§ 371 (c)(1),
(2) Date: Jan. 5, 2022

(87) PCT Pub. No.: WO2021/015434
PCT Pub. Date: Jan. 28, 2021

(65) Prior Publication Data
US 2022/0258933 A1    Aug. 18, 2022

(30) Foreign Application Priority Data
Jul. 23, 2019  (KR) .......................... 10-2019-0088814

(51) Int. Cl.
*B65D 51/16* (2006.01)
*A47J 47/06* (2006.01)
(Continued)

(52) U.S. Cl.
CPC ...... *B65D 51/1683* (2013.01); *B65D 79/0087* (2020.05); *B65D 81/2038* (2013.01);
(Continued)

(58) Field of Classification Search
CPC ............ B65D 51/1683; B65D 81/2038; B65D 25/085; B65D 79/0087; A47J 47/06; A47J 47/10
(Continued)

(56) References Cited

U.S. PATENT DOCUMENTS 7,874,420 B2 * 1/2011 Coon .................. B65D 25/085
                                                        222/129
10,507,965 B2 * 12/2019 Ho ..................... B65D 79/0087
(Continued)

FOREIGN PATENT DOCUMENTS

KR    101524412 B1 * 5/2015 ......... B65D 51/1644

*Primary Examiner* — Nathan J Jenness
*Assistant Examiner* — Jennifer Castriotta
(74) *Attorney, Agent, or Firm* — Studebaker Brackett PLLC

(57) ABSTRACT

The present invention relates to a push button made from one selected from soft synthetic resin and soft silicone, comprising: a protruding annular rim protruding downward from the circumferential direction of the perimeter of a support part; a guide groove for the linear movement of a pressing part, which is recessed downward from a portion at which the outer circumferential end portion of the pressing part and the upper end of a height-varying part are in contact with each other; and a cylindrical airtightness-maintaining rod for vertically moving downward by the pressing of the pressing part.

1 Claim, 3 Drawing Sheets

(51) Int. Cl.
*A47J 47/10* (2006.01)
*B65D 79/00* (2006.01)
*B65D 81/20* (2006.01)
*B65D 25/08* (2006.01)

(52) U.S. Cl.
CPC ............... *A47J 47/06* (2013.01); *A47J 47/10* (2013.01); *B65D 25/085* (2013.01)

(58) Field of Classification Search
USPC .......................................... 220/231; 215/262
See application file for complete search history.

(56) References Cited

U.S. PATENT DOCUMENTS

| | | | |
|---|---|---|---|
| 11,267,620 B1* | 3/2022 | Lu | B65D 45/327 |
| 2006/0032852 A1* | 2/2006 | Cai | B65D 51/1683 |
| | | | 220/804 |

* cited by examiner

[Figure 1]
(PRIOR ART)
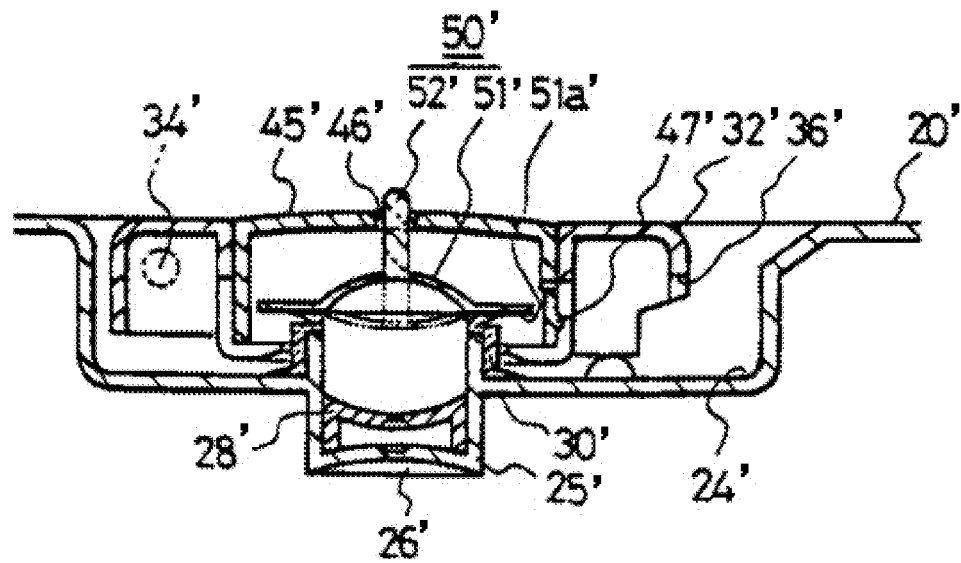
[Figure 2]
(PRIOR ART)
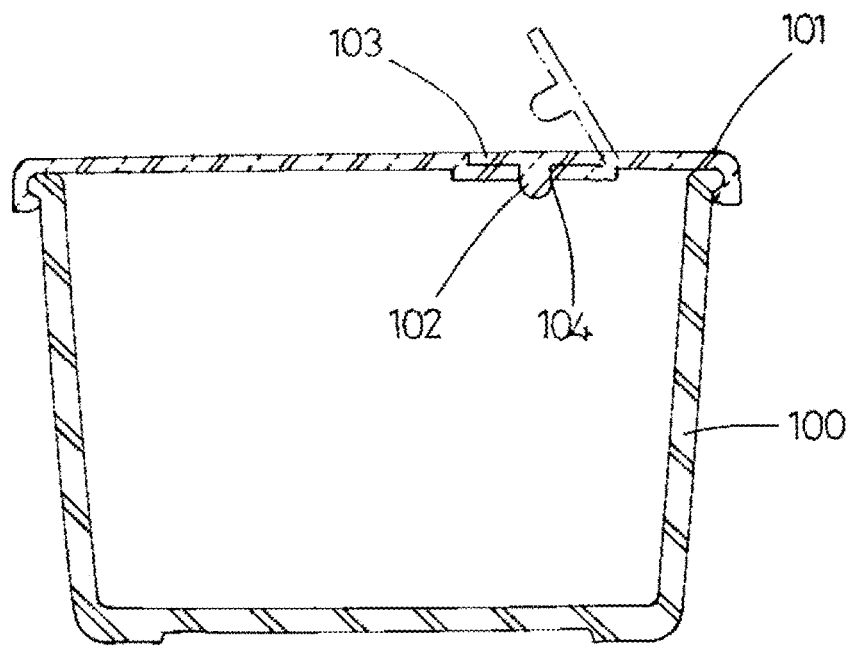

[Figure 3]
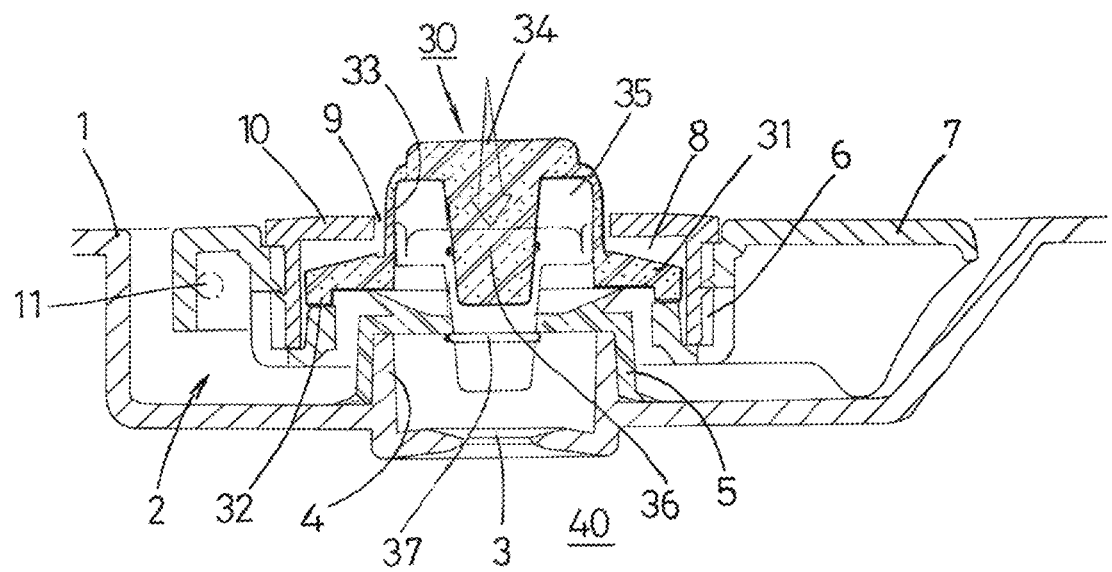
[Figure 4]
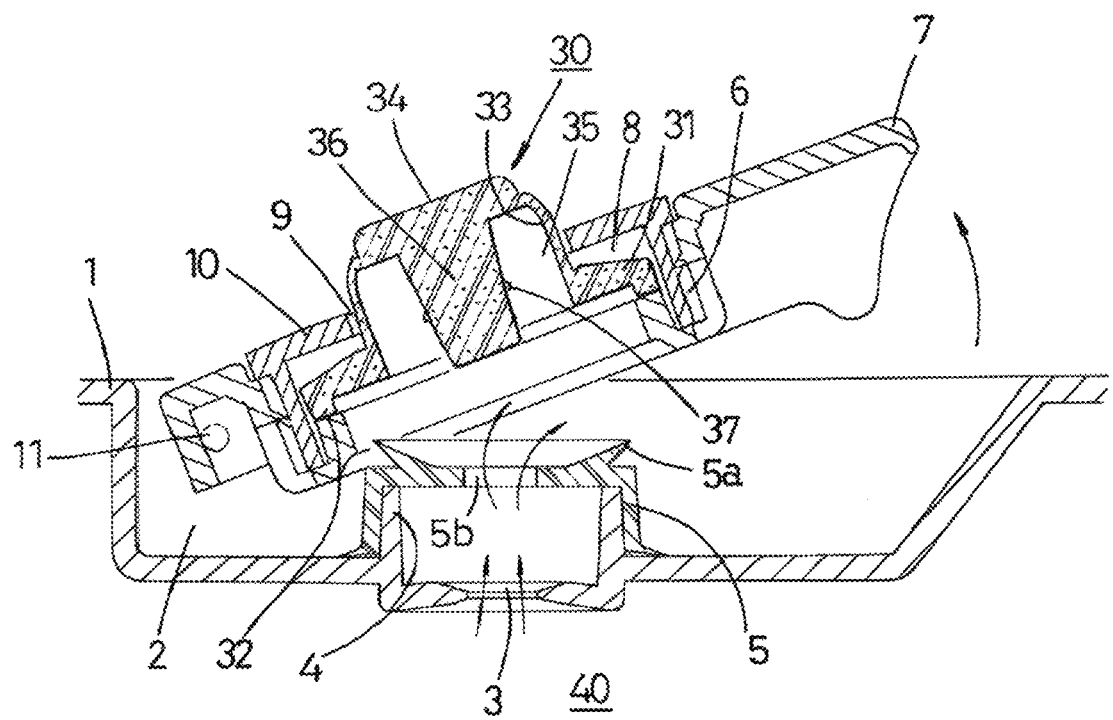

[Figure 5]
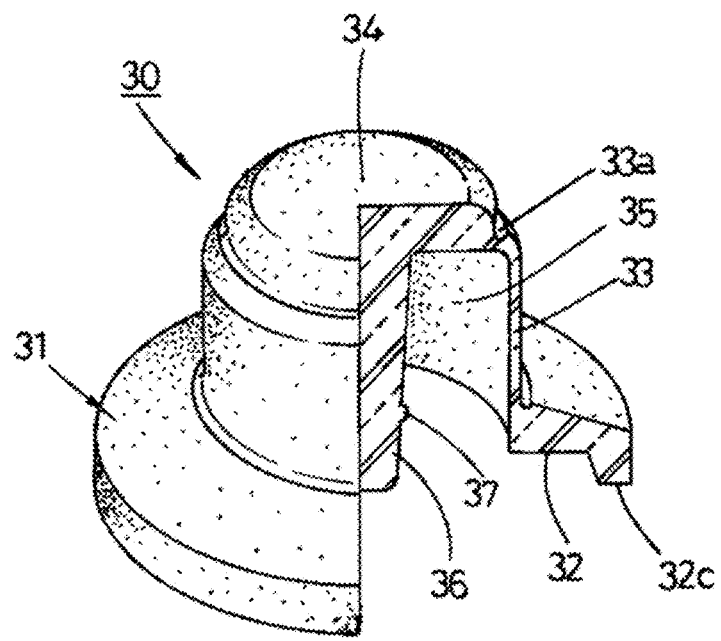
[Figure 6]
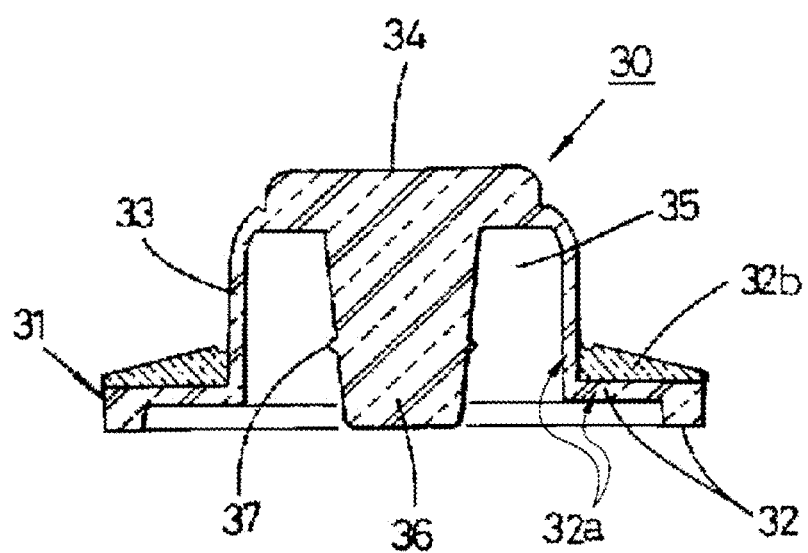

MULTI-PUSH BUTTON FOR VACUUM FOOD STORAGE CONTAINER HAVING VACUUM VALVE

TECHNICAL FIELD

The present invention relates to a multi-push button for a vacuum food storage container having a vacuum valve and, more specifically, relates to a multi-push button for a vacuum food storage container having a vacuum valve that is applied to a vacuum valve structure installed in a cover of the vacuum food storage container, which includes a container body having an opening and a cover having a vacuum valve structure for opening and closing the opening to maintain various kinds of food accommodated in the container body in a weak vacuum state and to prevent food spoilage for a long period of time and prolong the preservation period of food, thereby creating a weak multi-vacuum inside the container body and maintaining multiple airtight states for formation of a vacuum.

BACKGROUND ART

In general, a vacuum food storage container for storing food in a vacuum to maintain freshness thereof for a long period of time by preventing spoilage of food has been proposed to include a container body for storing food and a cover to open and close the opening of the container body in which a one-way valve enabling inflow/outflow of air of the container body is installed in the cover so that a user presses the cover to create a weak vacuum inside the container body or opens the valve to release the weak vacuum state inside the container body.

The Korean Utility Model Gazette (Publication No. Utility Model 1995-0002132/Publication Date, Mar. 25, 1995) discloses an air inflow/outflow valve of a vacuum food storage container previously filed by the applicant of the present application.

In the air inflow/outflow valve, an airtightness-maintaining pipe having an air inflow/outflow hole is installed in a cover for opening and closing the container body to maintain airtightness with the hemispherical cover, thereby preventing outflow of air to the outside. The conventional airtightness-maintaining pipe described above is only an initial airtightness-maintaining pipe that evacuates the air from the interior of the container body through the air inflow/outflow hole using a pump to maintain the interior of the container body in a weak vacuum state, and introduces air through the air inflow/outflow hole by pressing a push button to release the vacuum state.

FIG. 1 illustrates a vacuum storage container in Utility Model Application No. 20-2002-0004815 disclosed in the Korean Registered Utility Model Gazette (published on Apr. 16, 2001) previously filed by the applicant of the present application.

This discloses a container body having an opening and accommodating food, a cover for opening and closing the opening of the container body, a recess formed on the plate surface of the cover, a boss part having an air passing hole provided on the bottom surface of the recess to communicate the inside and the outside of the container body, a rotation cover having a predetermined accommodation part and opening and closing an opening of the recess, and a cover member detachably coupled to the accommodating part of the rotation cover and having a through-hole formed in the plate surface.

In addition, the conventional vacuum storage container has an airtight member having a hollow body detachably coupled to the boss part and a diaphragm-shaped extension flange extending in a radial direction on at least one surface of the hollow body, and includes a vacuum holding member having a disk-shaped main body received in a cover member having an airtight contact surface that comes into contact with the extension flange of the airtight member and an exposed bar extending from the main body such that at least a portion thereof is exposed to the outside through the through-hole of the cover member and rising and falling in the through-hole as the interior of the container body is evacuated and as the vacuum state thereof is released.

However, the conventional vacuum storage container described above has problems as follows because the interior of the container body is maintained in a weak vacuum state only by the configuration of the airtight member and the vacuum holding member in contact with the upper surface of the airtight member.

First, the airtight member is slightly abraded and damaged due to long-term use of the vacuum food storage container, washing the contaminated airtight member, and the like, thereby failing to provide a contact surface for airtightness and causing inflow/outflow of air therethrough, so it is difficult to maintain a weak vacuum state inside the container body.

Second, if a vacuum food storage container is dropped and applied with an impact to the container body and the cover, torsion or the like due to the impact occurs between the airtight member and the vacuum holding member in contact with the upper surface of the airtight member to maintain airtightness, and if air is introduced into the container body through the minute gap generated by the torsion, it is also difficult to maintain a weak vacuum state inside the container body, and a fluid contained in the contents leaks through the gap.

Third, a minute gap is generated between the airtight member and the vacuum holding member in contact with the upper surface of the airtight member for airtightness due to the gas pressure caused by the gas generated according to the oxidation of the food contained in the vacuum food storage container, and if air is introduced into the container body therethrough, the weak vacuum state inside the container body is also released, which causes the food contained in the container body to deteriorate and makes long-term storage impossible, thereby losing its value as a vacuum food container.

Meanwhile, FIG. 2 illustrates a cross-sectional view of a conventional container for a microwave oven. Here, the cover 101 for opening and closing the opening of the container body 100 is provided with an opening/closing plate 103 and a steam discharge hole 104 for discharging the steam generated inside the container body when the container is in the microwave oven for cooking, and the opening/closing plate has a protrusion 102 formed to open and close the steam discharge hole 104. However, the protrusion 102 formed on the opening/closing plate 103 merely serves to discharge the steam generated from the food contained in the container body to the outside of the container body when the container is heated in the microwave oven, and is not intended to propose configuration capable of forming a vacuum state or releasing the vacuum state inside the container.

Accordingly, in the vacuum container for storing food, it is required to propose a structure of a vacuum valve for improved vacuum maintenance and airtight maintenance to continuously maintain a weak vacuum state inside the container body in order to prevent spoilage of food for a long period of time and maintain freshness thereof for a long period of time.

DISCLOSURE OF INVENTION

Technical Problem

Therefore, in order to solve the existing problems described above, an objective of the present invention is to provide a multi-push button for a vacuum food storage container having a vacuum valve equipped with a push button that comes into contact with the upper surface of an airtight member or a boss part installed in the existing cover, as shown in FIG. 1, to maintain airtightness of an air inflow/outflow hole of the airtight member or an air inflow/outflow hole provided inside the boss part, and that comes into contact with the upper surface of the airtight member or the boss part installed in the existing cover to easily open the air inflow/outflow hole of the airtight member or the air inflow/outflow hole provided inside the boss part such that a weak multi-vacuum may be formed inside the container body while maintaining multiple airtight states by pressing the cover and push button, thereby further extending the preservation period of food without spoilage.

Solution to Problem

The objective is attained according to the present invention by a multi-push button for a vacuum food storage container having a vacuum valve including a push button that includes: a circular flange and a support part provided on the bottom surface of the flange; a thin height-varying part formed to protrude upwards by a predetermined height from the surface of the support part inside the outer diameter of the support part; a pressing part positioned on the upper surface of the height-varying part; and a cylindrical airtightness-maintaining rod protruding downwards from the inner side of the pressing part, which is the inner center of the height-varying part, by a predetermined length with a space in the circumferential direction, and moving vertically downwards by pressing the pressing part, wherein the push button is formed of any one selected from among soft synthetic resin and soft silicone.

Here, the push button including a constant-thickness portion of the support part is formed of any one selected from among soft synthetic resin and soft silicone, and a thickness portion of the support part is any one selected from among a configuration in which solid silicone is compressed and bonded and a configuration in which a solid synthetic resin is double-injected onto the upper surface of the constant-thickness portion.

The objective is attained according to the present invention by a multi-push button for a vacuum food storage container having a vacuum valve, which includes: a circular flange and a support part provided on the bottom surface of the flange, and a protruding annular rim protruding downwards from the outer circumference of the support part; a thin height-varying part formed to protrude upwards by a predetermined height from the surface of the support part inside the outer diameter of the support part; a pressing part positioned on the upper surface of the height-varying part; a guide groove for linear movement of the pressing part formed to be recessed downwards in a portion where an outer circumferential end portion of the pressing part and an upper end of the height-varying part come into contact with each other; and a cylindrical airtightness-maintaining rod protruding downwards from the inner side of the pressing part, which is the inner center of the height-varying part, by a predetermined length with a space in the circumferential direction, and moving vertically downwards by pressing the pressing part, wherein the push button is formed of any one selected from among soft synthetic resin and soft silicone.

Advantageous Effects of Invention

As described above, by installing a push button that comes into contact with the upper surface of the airtight member or the boss part installed in the existing cover to maintain airtightness of the air inflow/outflow hole of the airtight member or the air inflow/outflow hole formed in a diaphragm inside the boss part, and that comes into contact with the upper surface of the airtight member or the boss part installed in the existing cover to easily open the air inflow/outflow hole of the airtight member or the air inflow/outflow hole formed in the diaphragm inside the boss part such that a weak multi-vacuum may be formed inside the container body while maintaining multiple airtight states by pressing the cover and push button, the present invention has the effects of preventing the inflow/outflow of air even in the slightest abrasion or damage caused by cleaning the airtight member and preventing the inflow/outflow of air even if a minute gap is formed due to torsion of the airtight member by the impact to the cover. Furthermore, even if a minute gap is formed due to the gas pressure generated from the food contained in the container body, it is possible to prevent the inflow/outflow of air, and as a result, the storage period of food can be significantly extended without spoilage.

BRIEF DESCRIPTION OF DRAWINGS

FIG. 1 is a cross-sectional view of a vacuum valve of a conventional vacuum food storage container.

FIG. 2 is a cross-sectional view of a conventional container for a microwave oven.

FIG. 3 is a cross-sectional view of the vacuum valve showing the installation and operation state of a push button according to the present invention.

FIG. 4 is a cross-sectional view showing the state in which a push button according to the present invention is opened by rotation of a rotation cover.

FIG. 5 is a cutaway view showing the internal structure of a part of the push button according to the first embodiment of the present invention.

FIG. 6 is a cross-sectional view showing another embodiment of a push button according to the present invention.

5$b$: Air inflow/outflow hole 30: Push button
31: Flange 32: Support part
32$a$, 32$b$: Constant-thickness part 32$c$: Protruding annular rim
33: Height-varying part 33$a$: Guide groove for linear movement of pressing part
34: Pressing part 35: Space
36: Airtightness-maintaining rod 37: Annular locking jaw

BEST MODE FOR CARRYING OUT THE INVENTION

Hereinafter, the present invention will be described in detail with reference to the accompanying drawings.

First, FIG. 3 is a cross-sectional view of the vacuum valve showing the installation and operation state of a push button according to the present invention, FIG. 4 is a cross-sectional view showing the state in which a push button according to the present invention is opened by rotation of a rotation cover, FIG. 5 is a cutaway view showing the internal structure of a part of the push button according to the first embodiment of the present invention, and FIG. 6 is a cross-sectional view showing another embodiment of a push button according to the present invention.

As shown in the drawings, a vacuum food container to be used with a push button 30 according to the present invention is configured to include a container body (not shown) having an opening and a cover 1 to close the opening of the container body.

In the drawings of the present invention, a recess 2 is formed on the plate surface of a normal cover 1, and a boss part 4 having an air passing hole 3 for communicating the interior 40 of the container body and the outside is formed on the bottom of the recess.

An airtight member 5 formed of soft silicone and having an airtightness-maintaining wing 5a and an air inflow/outflow hole 5b is installed in the general boss part 4 disclosed in the present invention. In addition, a rotation cover 7, having a predetermined lower accommodation portion 6, for opening and closing the airtight member 5 is rotatably installed in the recess 2 by a hinge 7a, and a cover member 10 having a through-hole 9 formed on the plate surface thereof is detachably coupled to the upper accommodation portion 8 of the rotation cover, and a push button 30, according to the present invention, formed of any one selected from among soft synthetic resin and soft silicone is provided inside the cover member 10.

The push button 30 according to the present invention has a support part 32 configured as a circular flange 31 and a protruding annular rim 32c installed to protrude downwards from the outer circumference of the support part 32, and a thin height-varying part 33 is formed to protrude upwards by a certain height from the surface of the support part inside the outer diameter of the support part 32 and a pressing part 34 is formed on the upper surface of the height-varying part 33. Here, a guide groove 33a for linear movement of the pressing part 34 is formed to be recessed downwards in a portion where the outer circumferential end portion of the pressing part 34 and the upper end of the height-varying part 33 come into contact with each other.

A cylindrical airtightness-maintaining rod 36 is formed to protrude downwards in the vertical direction from the inner side of the pressing part 34, which is the inner center of the height-varying part 33 according to the present invention, and an annular locking jaw 37 is formed in the lower region of the airtightness-maintaining rod. A space 35 is formed in the circumferential direction between the airtightness-maintaining rod 36 and the height-varying part 33, and when the pressing part 34 is pressed by the user, the pressing part 34 is guided by the guide groove 33a for linear movement of the pressing part 34, which is formed to be recessed downwards in the portion where the outer circumferential end portion of the pressing part 34 and the upper end of the height-varying part 33 come into contact with each other, to be folded into the space 35 together with the height-varying part 33 so as to be rolled up therein and moved vertically downwards as shown in FIG. 3. Here, although the height-varying part 33 according to the present invention is configured as a thin cylindrical wall, the height-varying part 33 may be configured as a structure capable of being rolled up or folded with the downward movement of the height-varying part 33 by pressing the pressing part 34, that is, a corrugated pipe in which multiple corrugations are formed along the circumferential direction of the outer wall or a form similar to the corrugated pipe, thereby playing the role of the height-varying part 33 according to the present invention.

In the push button 30 according to the present invention, the support part 32 formed on the bottom surface of the push button 30 comes into contact with the upper surface of the general airtight member 5 fitted to the boss part 4, as shown in FIG. 3, to maintain the airtight state. Meanwhile, the push button 30 according to the present invention can be used so that the support part 32 formed on the bottom of the push button 30 comes into direct contact with the upper surface of the boss part 4 without the airtight member 5 to maintain the airtight state.

First, an operation in which the push button 30 according to the present invention comes into contact with the upper surface of the normal airtight member 5 fitted to the boss part 4 to maintain the airtight state will be described.

In the present invention, when the user presses the cover 1 with a palm in the state in which the support part 32 of the push button 30 is in contact with the upper surface of the normal airtight member 5, the air in the interior 40 of the container body pushes the amount of air corresponding to the downward movement of the cover upwards to be discharged through the air inflow/outflow hole 5b, and at the same time, when the pressing of the cover 1 is finished, the support part 32 of the push button 30 is in airtight contact with the airtightness-maintaining wing 5a to form a primary vacuum state in the interior 40 of the container body.

Afterwards, when the user presses the pressing part 34 of the push button 30 with a finger, the airtightness-maintaining rod 36 moves vertically downwards to be inserted into the air inflow/outflow hole 5b so that the amount of remaining air corresponding to the movement thereof is discharged through the air inflow/outflow hole 5b from the interior of the container body, and at the same time, when the pressing operation of the pressing part 34 is finished, a secondary vacuum state is formed between the bottom surface of the push button 30 and the upper surface of the airtight member 5. As the airtightness-maintaining rod 36 continues to move vertically downwards to be deeply inserted into the air inflow/outflow hole 5b so that the amount of remaining air corresponding to the movement thereof is discharged through the air inflow/outflow hole 5b from the interior of the container body, thereby maintaining a weak vacuum state, which is a tertiary vacuum state, in the interior 40 of the container body.

As a result, the present invention enables the container to maintain multiple airtight states by primarily preventing outflow of the air in the interior 40 of the container body by the airtightness-maintaining rod 40 that airtightly closes the air inflow/outflow hole 5b and by secondarily preventing outflow of the air through airtightness by the contact and suction adhesion between the bottom surface of the support part 32 of the push button 30 and the airtightness-maintaining wing 5a of the airtight member 5. Here, the annular locking jaw 37 formed on the airtightness-maintaining rod 36 is deeply inserted into the air inflow/outflow hole 5b and is caught on the bottom surface of the air inflow/outflow hole 5b so as to prevent the airtightness-maintaining rod 36 from escaping itself from the air inflow/outflow hole 5b.

Meanwhile, in the case of releasing the weak vacuum state in the interior 40 of the container body while the support part 32 of the push button 30 is in the airtight contact with the airtightness-maintaining wing 5a of the airtight member 5, as shown in FIG. 3, if one side of the rotation cover 7 is lifted to be rotated about the hinge shaft 11, the support part 32 of the push button 30 is forcibly lifted to release the airtight contact state with the airtightness-maintaining wing 5a of the airtight member 5a so that external air is instantaneously introduced into the interior 40 of the container body through the air inflow/outflow hole 5b to release the weak vacuum state in the interior 40 of the container body, and thus the cover 1 can be easily opened.

In the present invention, in the case of forming a weak vacuum in the interior 40 of the container body again, the cover 1 is pressed with a palm after rotating the normal rotation cover 7 downwards to the original position such that the support part 32 of the push button 30 comes into airtight contact with the airtightness-maintaining wing 5a of the airtight member 5, and the pressing part 34 is pressed with a finger to maintain multiple airtight states in the interior 40 of the container body, thereby maintaining a weak vacuum state.

Hereinafter, an operation in which the push button 30 according to the present invention comes into direct contact with the upper surface of the boss part 4 without the airtight member 5, as shown in FIG. 3, to maintain the airtight state will be described.

In the present invention, when the user presses the cover 1 with a palm in the state in which the support part 32 of the push button 30 is in contact with the upper surface of the normal boss part 4, the air in the interior 40 of the container body is discharged through the opening of the boss part 4, and at the same time, when the pressing of the cover 1 is finished, the support part 32 of the push button 30 is in airtight contact with the upper surface of the boss part 4 to form a primary vacuum state in the interior 40 of the container body.

Afterwards, when the user presses the pressing part 34 of the push button 30 with a finger, the airtightness-maintaining rod 36 is vertically inserted into the air inflow/outflow hole (not shown), which is formed in a diaphragm inside the boss part 4, so that the remaining air in the interior of the container body is discharged through the air inflow/outflow hole, and at the same time, when the pressing operation of the pressing part 34 is finished, a secondary vacuum state is formed between the bottom surface of the push button 30 and the upper surface of the boss part 4. As the airtightness-maintaining rod 36 continues to move vertically downwards to be deeply inserted into the air inflow/outflow hole so that the remaining air is discharged through the air inflow/outflow hole by the airtightness-maintaining rod 36 to maintain a weak vacuum state, which is a tertiary vacuum state, in the interior 40 of the container body.

As a result, the present invention enables the container to maintain multiple airtight states by primarily preventing outflow of the air in the interior 40 of the container body by the airtightness-maintaining rod 40 that airtightly closes the air inflow/outflow hole and by secondarily preventing outflow of the air through airtightness by the contact and suction adhesion between the bottom surface of the support part 32 of the push button 30 and the upper surface of the boss part 4.

Meanwhile, in the case of releasing the weak vacuum state in the interior 40 of the container body while the support part 32 of the push button 30 is in the airtight contact with the upper surface of the boss part 4, as shown in FIG. 3, if one side of the rotation cover 7 is lifted to be rotated about the hinge shaft 11, the support part 32 of the push button 30 is forcibly lifted to release the airtight contact state with the upper surface of the boss part 4 so that external air is instantaneously introduced into the interior 40 of the container body through the air inflow/outflow hole to release the weak vacuum state in the interior 40 of the container body, and thus the cover 1 can be easily opened.

In the present invention, in the case of forming a weak vacuum in the interior 40 of the container body again, the cover 1 is pressed with the palm after rotating the normal rotation cover 7 downwards to the original position such that the support part 32 of the push button 30 comes into airtight contact with the upper surface of the boss part 4, and the pressing part 34 is pressed with a finger to maintain multiple airtight states in the interior 40 of the container body, thereby maintaining a weak vacuum state.

MODE FOR CARRYING OUT THE INVENTION

Meanwhile, in the present invention, the push button 30 including a constant-thickness portion 32a of the support part 32 is formed of any one selected from among soft synthetic resin and soft silicone, and a thickness portion 32b of the support part further includes any one selected from among a configuration in which solid silicone that is unable to be folded is compressed and bonded and a configuration in which a solid synthetic resin is double-injected onto the upper surface of the constant-thickness portion 32a. Therefore, since the thickness portion 32b of the support part 32 does not undergo shape deformation when the normal rotation cover 7 is lifted, the flange 31 is prevented from being folded upwards and separated from the upper accommodation portion 8.

As described above, by installing a push button 30 that comes into contact with the upper surface of the normal airtight member 5 or the boss part 4 installed in the existing cover 1 to maintain airtightness of the air inflow/outflow hole 5b of the airtight member 5 or the air inflow/outflow hole (not shown) formed in a diaphragm inside the boss part 4, and that comes into contact with the upper surface of the airtight member or the boss part installed in the existing cover to easily open the air inflow/outflow hole of the airtight member or the air inflow/outflow hole formed in the diaphragm inside the boss part such that a weak multi-vacuum may be formed inside the container body while maintaining multiple airtight states by pressing the cover and push button, the present invention has the effects of preventing the inflow/outflow of air even in the slightest abrasion or damage caused by cleaning the airtight member and preventing the inflow/outflow of air even if a minute gap is formed due to torsion of the airtight member by the impact to the cover. Furthermore, even if a minute gap is formed due to the gas pressure generated from the food contained in the container body, it is possible to prevent the inflow/outflow of air, and as a result, the storage period of food can be further extended without spoilage.

INDUSTRIAL APPLICABILITY

As described above, the terms or words used in the present specification and claims should not be construed as conventional and dictionary meanings, but should be construed as the meaning and concept consistent with the technical idea of the present invention on the basis of the principle in which the inventor is entitled to appropriately define the concept of the term in order to fully describe the invention.

Therefore, the configuration disclosed in the embodiment and the drawings described in this specification is only a preferred embodiment of the present invention, and does not represent all technical ideas of the present invention, so it should be noted that there may be various equivalents and modifications capable of replacing the same at the time of filing the present application.

The invention claimed is:

1. A multi-push button for a vacuum food storage container having a vacuum valve, comprising:
    a circular flange and a support part provided on a bottom surface of the flange;
    a thin height-varying part formed to protrude upwards by a predetermined height from the surface of the support part inside an outer diameter of the support part;
    a pressing part positioned on an upper surface of the height-varying part;
    an airtightness-maintaining rod protruding downwards a predetermined length from a center of an inner side of the pressing part, and moving vertically downwards by pressing the pressing part, wherein the airtightness-maintaining rod has a circular cross-section when cut by a transverse plane taken at any height along the airtightness-maintaining rod, and wherein there is a space between the height-varying part and the airtightness-maintaining rod; and
    a protruding annular rim protruding downwards from an outer circumference of the support part,
    wherein, when the pressing part is pressed downward, shape of the height-varying part is varied such that an upper part of the height-varying part is rolled or folded toward a downward direction, thus forming facing surfaces where a first sidewall surface which is a sidewall surface of the pressing part and a second sidewall surface which is a sidewall surface of the upper part of the height-varying part face each other by the rolling or the folding of the upper part of the height-varying part,
    the first sidewall surface is substantially vertical, and the second sidewall surface which faces the first sidewall surface when the pressing part is pressed downward is also substantially vertical, and
    the push button is formed of any one selected from among soft synthetic resin and soft silicone.

* * * * *